(12) United States Patent
Hong et al.

(10) Patent No.: US 12,636,673 B2
(45) Date of Patent: May 26, 2026

(54) METHOD OF MANUFACTURING SHIM FOR DIE COATER USING MILLING PROCESS

(71) Applicant: LG Energy Solution, Ltd., Seoul (KR)

(72) Inventors: Seong Wook Hong, Daejeon (KR); Dong Hun Song, Daejeon (KR); Sang Hoon Choy, Daejeon (KR); Shin Wook Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 644 days.

(21) Appl. No.: 17/915,199

(22) PCT Filed: Dec. 1, 2021

(86) PCT No.: PCT/KR2021/017939
§ 371 (c)(1),
(2) Date: Sep. 28, 2022

(87) PCT Pub. No.: WO2022/131620
PCT Pub. Date: Jun. 23, 2022

(65) Prior Publication Data
US 2023/0120286 A1     Apr. 20, 2023

(30) Foreign Application Priority Data

Dec. 18, 2020     (KR) ........................ 10-2020-0178726

(51) Int. Cl.
*B23C 3/00*     (2006.01)
*B05C 5/02*     (2006.01)
*H01M 4/04*     (2006.01)

(52) U.S. Cl.
CPC ......... *B05C 5/0254* (2013.01); *H01M 4/0404* (2013.01)

(58) Field of Classification Search
CPC ............ B05C 5/0254; B23C 3/10; B23C 3/20
See application file for complete search history.

(56) References Cited

U.S. PATENT DOCUMENTS

| | | | |
|---|---|---|---|
| 6,224,672 | B1 | 5/2001 | Jenkins |
| 2003/0116881 | A1 | 6/2003 | Nelson et al. |
| 2013/0236651 | A1 | 9/2013 | Komatsubara et al. |

(Continued)

FOREIGN PATENT DOCUMENTS

| | | |
|---|---|---|
| CN | 204034968 U | 12/2014 |
| CN | 108421678 A | 8/2018 |
| CN | 207680919 U | 8/2018 |

(Continued)

OTHER PUBLICATIONS

International Search Report for Application No. PCT/KR2021/017939 mailed Mar. 7, 2022, 2 pages.

(Continued)

*Primary Examiner* — Alan Snyder
(74) *Attorney, Agent, or Firm* — Lerner David LLP

(57) ABSTRACT

A method of manufacturing a shim for a die coater is disclosed herein. In some embodiments, a method of manufacturing a shim for a die coater, where the shim is applied to an electrode slurry die of the die coater and used for discharging an electrode slurry from the die coater, comprising milling a surface of a metal plate to prepare the shim. Using the method herein, it is possible to manufacture a shim for a die coater having a low thickness deviation by processing the shim for a die coater through a milling process.

10 Claims, 4 Drawing Sheets

200

240

C

210

220

230

(56) References Cited

U.S. PATENT DOCUMENTS

2019/0299240  A1    10/2019   Ayers

FOREIGN PATENT DOCUMENTS

| | | | |
|---|---|---|---|
| CN | 211726368 | U | 10/2020 |
| JP | H11188301 | A | 7/1999 |
| JP | 3969690 | B2 | 9/2007 |
| JP | 4550194 | B2 | 9/2010 |
| JP | 5315453 | B1 | 10/2013 |
| JP | 2013212492 | A | 10/2013 |
| KR | 20040068949 | A | 8/2004 |
| KR | 20150031036 | A | 3/2015 |
| KR | 20190096114 | A | 8/2019 |
| KR | 102124793 | B1 | 6/2020 |

OTHER PUBLICATIONS

Search Report dated Apr. 25, 2024 from the Office Action for Chinese Application No. 202180022709.X Issued Apr. 29, 2024, pp. 1-3.

【FIG. 1】
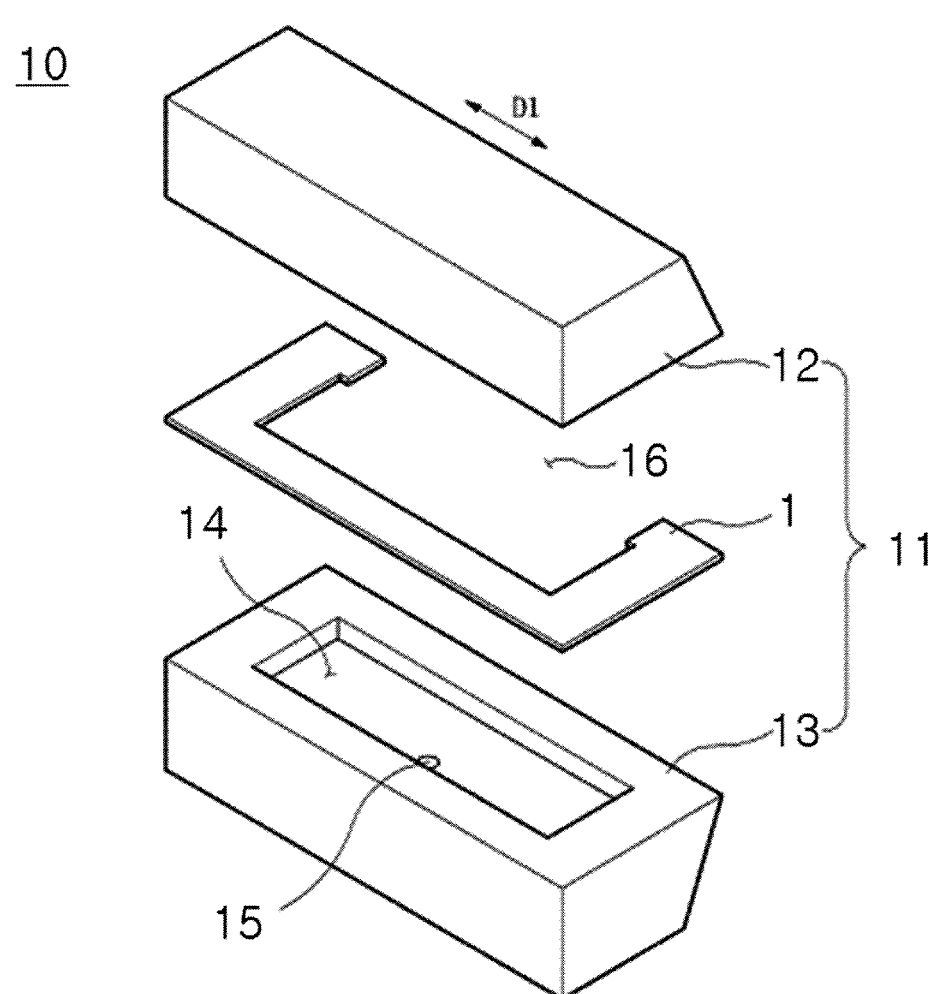
Prior Art

【FIG. 2】
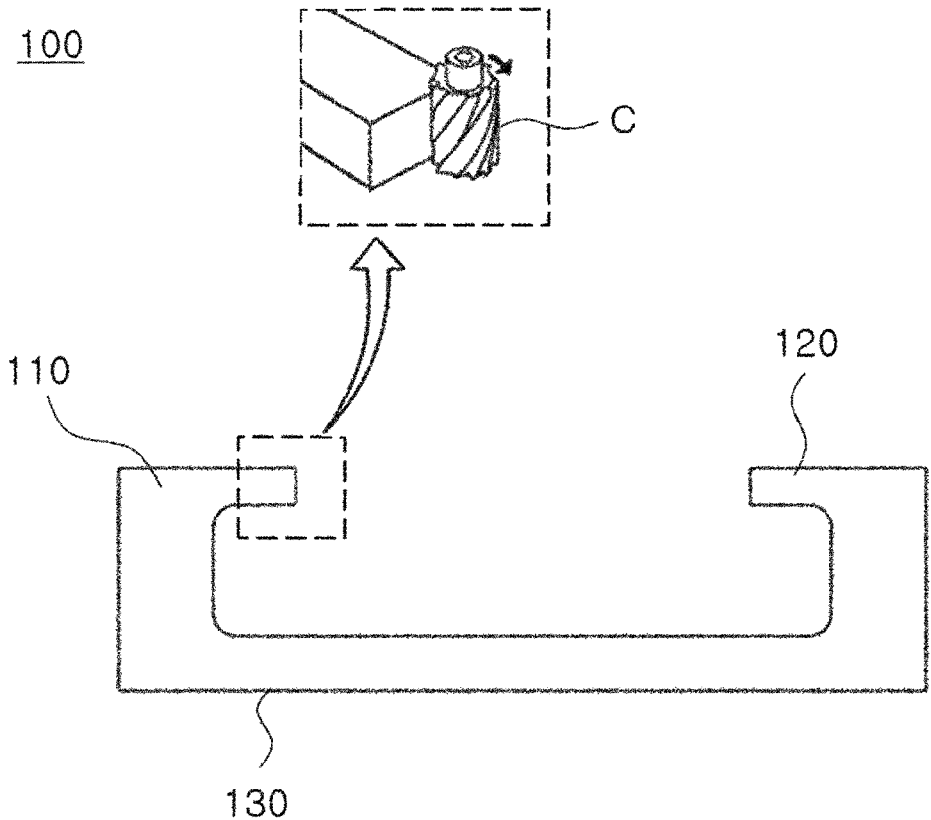

【FIG. 3】
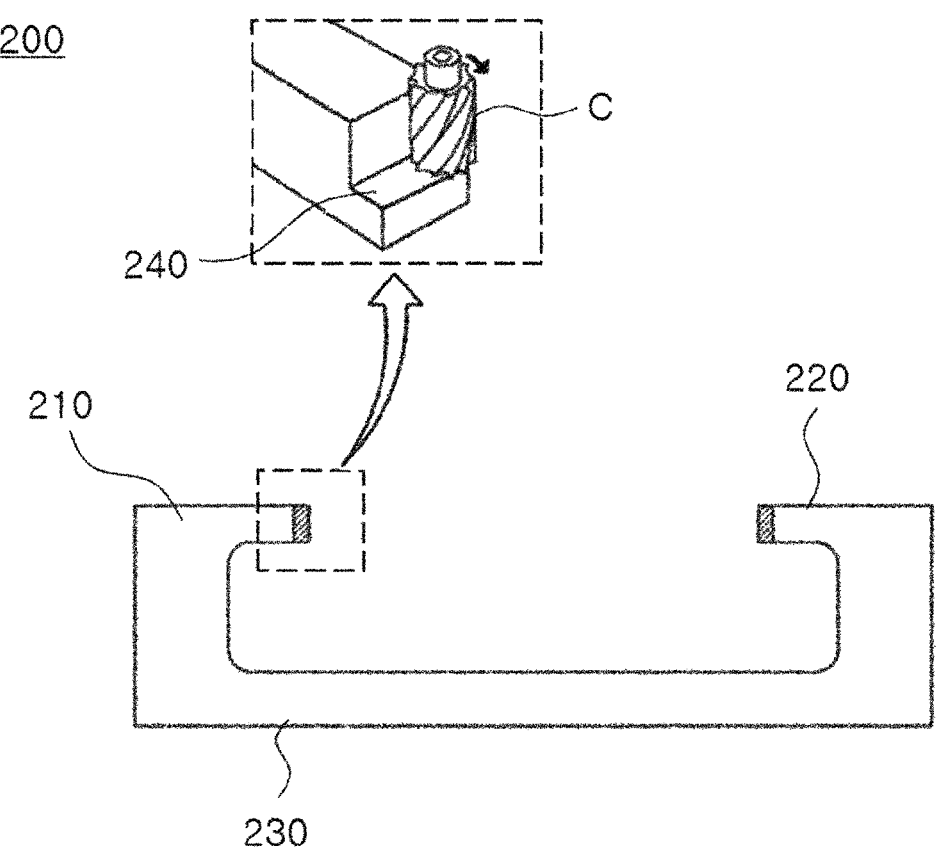

【FIG. 4】
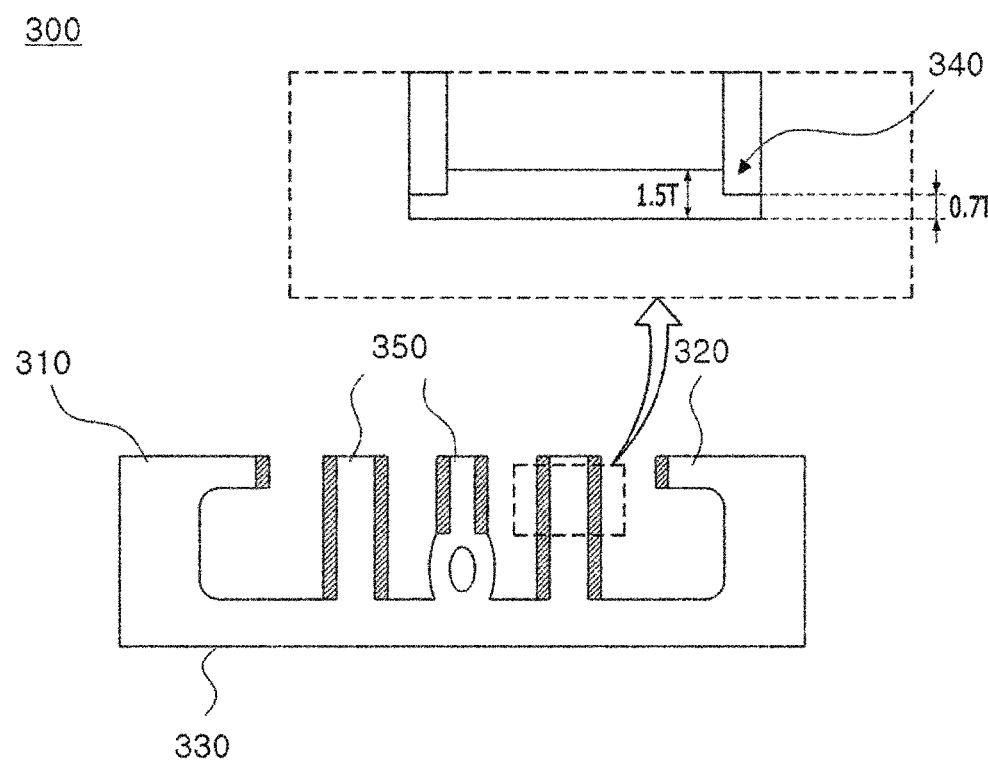

METHOD OF MANUFACTURING SHIM FOR DIE COATER USING MILLING PROCESS

CROSS-REFERENCE TO RELATED APPLICATIONS

This application is a national phase entry under 35 U.S.C. § 371 of International Application No. PCT/KR2021/017939, filed on Dec. 1, 2021, which claims priority from Korean Patent Application No. 10-2020-0178726, filed on Dec. 18, 2020, and the contents of which are incorporated by reference herein.

TECHNICAL FIELD

The present disclosure relates to a method of manufacturing a shim for a die coater using a milling process.

BACKGROUND ART

A secondary battery can be recharged and may be formed in a small size or as a large capacity. Accordingly, a lot of research and development in secondary batteries are currently in progress. Such secondary batteries are manufactured as a form in which one battery cell is packed as a pack or tens of battery cells are connected as a pack, and are widely used for a mobile phone, a notebook computer, and a power source for driving a motor of an electric vehicle.

An electrode of a secondary battery is manufactured by applying slurry, which is obtained by mixing an active material with a conductive agent, on a metal foil, drying and pressing the metal foil. A die coater for electrode production is equipment for applying slurry on a metal foil.

A die coater is a device which supplies a fluid (slurry, an adhesive, a hard coating agent, ceramic, etc.) with fluidity to a space between upper and lower dies by using a pulseless pump or a piston pump, and coats the supplied fluid on an object such as a fabric, a film, a glass plate, or a sheet to have a constant thickness.

FIG. 1 is an exploded perspective view showing a decomposition state of a conventional die coater for electrode production. Referring to FIG. 1, a die coater 10 includes a supply port 15 through which a slurry is supplied to a slot die. The slurry supplied from a supply port 15 is moved into a body 11 having an inner space 14 which is connected to the supply port 15 and accommodates slurry. The body 11 includes an upper die 12, a lower die 13, and a shim between the upper die 12 and the lower die 13. The slurry is widely spread in the width direction of a discharge port 16 in the inner space of the body 11 and is then discharged through the discharge port 16. As such, a slurry can be coated on an electrode current collector.

Further, the shim 1, which is used in the die coater 10, has been processed by a wiring process. However, in the shim, which is manufactured by the wiring process, the loading in the width direction was not uniform at the time of loading an electrode slurry due to a large thickness deviation.

Hence, there is a need for a method of manufacturing a shim for a die coater having a low thickness deviation in order to allow a uniform loading amount in the width direction at the time of loading an electrode slurry.

DISCLOSURE

Technical Problem

The present disclosure is believed to solve at least some of the above problems. For example, an aspect of the present disclosure provides a method of manufacturing a shim for a die coater using a milling process in order manufacture a shim for a die coater having a low thickness deviation.

Technical Solution

The present disclosure provides a method of manufacturing a shim for a die coater using a milling process. In one example, the present disclosure relates to a method of manufacturing a shim for a die coater, where the shim is applied to an electrode slurry die of the die coater and used for discharging an electrode slurry from the die coater, and the method includes: milling a surface of a metal plate to prepare the shim.

In a specific example, the milling of the surface of the metal plate to prepare the shim for a die coater includes: fixing the metal plate to a milling machine; and milling the surface of the fixed metal plate using a milling cutter which rotates against the surface of the metal plate to remove metal and prepare the shim.

In one example, the milling of the surface of the metal plate includes forming a slurrly charge line having first and second guides that define an opening that is the slurry discharge line by cutting the metal plate.

In another example, the milling of the surface of the metal plate further includes: forming a slurry discharge line having first and second guides by cutting the metal plate, and wherein opposing surfaces of the first and second guides define an opening that is the slurry discharge line; and cutting a step along each surface of the first and second guides. In a specific example, each step has a thickness that is $3/10$ to $6/10$ of the thickness of the first and second guides. At this time, the step is cut using a milling cutter.

For example, in the first and second guides, an average thickness of a region where a step is not formed is in a range of 1 mm to 3 mm, and an average thickness of a step is in a range of 0.4 mm to 0.9 mm.

In further another example, the milling of the surface of the metal plate further includes: forming first and second slurry discharge lines by cutting the metal plate, wherein opposing surfaces of a first guide and a sub-guide define a first opening that is the first slurry discharge line and wherein opposing surfaces of a second guide and the sub-guide define a second opening that is the second slurry discharge line. Further, the milling of the surface of the metal plate may further include cutting a step along each surface of the first and second guides, and the sub-guide.

In a specific example, each step has a thickness that is $3/10$ to $6/10$ of the thickness of the first and second guides and the sub-guide. At this time, each step is cut using a milling cutter.

For example, in the first and second guides the sub-guide, an average thickness of a region where a step is not formed is in a range of 1 mm to 3 mm, and an average thickness of a step is formed is in a range of 0.4 mm to 1.5 mm.

Advantageous Effects

According to a method of manufacturing a shim for a die coater using a milling process of the present disclosure, it is possible to manufacture a shim for a die coater which has a precise thickness and has a discharge line at regular intervals by using a milling process.

BRIEF DESCRIPTION OF THE DRAWINGS

FIG. 1 is an exploded perspective view showing a decomposition state of a conventional die coater for electrode production.

FIG. 2 is a schematic diagram showing a process of manufacturing a shim for a die coater according to one embodiment of the present disclosure.

FIG. 3 is a schematic diagram showing a process of manufacturing a shim for a die coater according to another embodiment of the present disclosure.

FIG. 4 is a schematic diagram illustrating a shim for a die coater manufactured according to a method of manufacturing a shim for a die coater according to further another embodiment of the present disclosure.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present disclosure to the specific form disclosed, and it should be understood to include all changes, equivalents, and substitutes included in the spirit and scope of the present disclosure.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present disclosure relates to a method of manufacturing a shim for a die coater using a milling process.

A conventional shim for a die coater has been processed by a wiring process. However, in the shim for a die coater, which is manufactured by the wiring process, the thickness deviation was large, and accordingly, the loading in the width direction was not uniform at the time of loading an electrode slurry. As such, the present disclosure provides a method of manufacturing a shim for a die coater having a low thickness deviation in order to allow a uniform loading amount in the width direction at the time of loading an electrode slurry. Specifically, according to a method of manufacturing a shim for a die coater of the present disclosure, it is possible to manufacture a shim for a die coater having a low thickness deviation by including an operation of processing the shim for a die coater through a milling process. Particularly, the thickness deviation of the shim for a die coater manufactured according to the present disclosure can be reduced to about ⅓ of the shim for a die coater according to a conventional art.

Hereinafter, a method of manufacturing a shim for a die coater using a milling process according to the present disclosure will be described in detail.

In one example, the present disclosure relates to a method of manufacturing a shim for a die coater, which is applied to an electrode slurry die for discharging an electrode slurry, and the method includes: milling a surface of a metal plate to prepare the shim.

In the present disclosure, the milling process means a cutting process of removing materials from the surface of the shim for a die coater using a rotary cutter. Further, the milling process is different from the drilling in which a tool moves forward along the rotation axis. The cutter used during the milling process may be moved in a direction that is perpendicular to the axis where a disconnection occurs in the circumference.

In a specific example, the processing of the shim for a die coater includes fixing a metal plate at a milling machine, and then milling a surface of the fixed metal plate using a milling cutter (C) which rotates against the surface of the metal plate to remove metal from the metal plate. More specifically, in order to process the shim for a die coater, a metal plate may be fixed at a milling machine. The metal plate can be fixed at a fixed die of a milling machine.

Herein, the milling cutter means a rotary cutting tool which is used in a milling machine. The milling cutter has a plurality of cutting edges on a cylindrical outer circumference, but the present disclosure is not limited to this example. In addition, the milling cutter may have a plurality of cutting edges on a conical outer circumference or cross-section.

In one example, the milling of the surface of the metal plate includes forming first and second guides by cutting a slurry discharge line of the metal plate. In a specific example, the milling cutter (C) is connected to a driving means such as a motor to be operated, and the die, at which the metal plate has been fixed, may form first and second guides by cutting a slurry discharge line while moved in a left and right direction, in a state that the milling cutter (C) rotates. However, the present disclosure is not limited thereto. A die, at which the metal plate is fixed, is fixed, and the milling cutter (C) may cut the slurry discharge line while moved. As such, it is possible to process the shim for a die coater to have a precise thickness. Further, the shim for a die coater may have a discharge line at regular intervals.

It means that a step is formed on the boundary surface with the discharge line in the first and second guides, and the step is formed on the inner surface of first and second guides contacting the slurry. In a specific example, the discharge line and the boundary surface of the slurry are formed to be lower, compared to the entire thickness of the first and second guides. This is to smoothly apply slurry on an edge portion when coating slurry.

The average thickness of the shim for a die coater manufactured according thereto may be in the range of 1 mm to 3 mm. Further, the thicknesses of shims for a die coater, which are used at the time of manufacturing a negative electrode and a positive electrode, may be different from each other. For example, the thickness of the shim for a die coater used at the time of manufacturing a negative electrode may be 1.5 mm, and the thickness of the shim for a die coater used at the time of manufacturing a positive electrode may be 2.0 mm.

The shim for a die coater manufactured as described above has a plate shape. One side of the shim is opened, and the other side is closed. At this time, a slurry can be discharged through an opened region (e.g., an opening) of the shim for a die coater. Further, the base can close the other end of the shim for a die coater by connecting other ends of the first and second guides to each other. In one example, the base connects other ends of the first and second guides to each other and is formed in a simple straight line form. However, the present disclosure is not limited thereto.

In another example, the method of manufacturing a shim for a die coater using a milling process according to the present disclosure includes processing the shim for a die coater through a milling process. In a specific example, the processing of the shim for a die coater includes fixing a metal plate at a milling machine, and then milling a surface of the fixed metal plate using a milling cutter (C) which rotates against the surface of the metal plate. In order to process the shim for a die coater, a metal plate is fixed at a milling machine. Since the method of operating the milling machine was described above, the redundant description thereof is omitted here.

Further, the milling of the surface of the metal plate further includes: forming a slurry discharge line having first and second guides by cutting the metal plate, wherein opposing surfaces of the first and second guides define an opening that is the slurry discharge line; and cutting a step along each surface of the first and second guides. In the process, each step is cut using the milling cutter (C).

In a specific example, the first and second guides of a shim for a die coater manufactured according to the above method have a structure that a step is formed on the boundary surface with the discharge line, and the step is formed on the inner surface of first and second guides contacting the slurry. Namely, the thickness of the discharge line and the boundary surface of the slurry is set to be smaller than the entire thickness of the first and second guides. This is to smoothly apply slurry on an edge portion when coating slurry.

The first and second guides have a step having at thickness that is 3/10 to 6/10 of the thickness of the first and second guides. Alternatively, the first and second guides have a step having at thickness that is 4/10 to 5/10 of the thickness of the first and second guides. In a specific example, in the first and second guides, an average thickness of a region where a step is not formed is in a range of 1 mm to 3 mm, and an average thickness of a step is in a range of 0.4 mm to 1.5 mm. Alternatively, in the first and second guides, an average thickness of a region where a step is not formed may be in a range of 1.4 mm to 2.5 mm, and an average thickness of a step may be in a range of 0.5 mm to 1.0 mm. For example, in the first and second guides, when an average thickness of a region where a step is not formed is 1.5 mm, and an average thickness of a step may be in a range of 0.5 mm to 0.7 mm. Namely, the shim for a die coater according to the present disclosure can control the length and shape of the edge portion of the slurry coated on the electrode current collector by making the thickness of the boundary surface of the slurry discharge line of first and second guides.

Further, in the present disclosure, it is possible to perform a precise processing work by applying a milling process during the manufacturing of a shim for a die coater. The thickness deviation may be low in the region where the step is formed.

In another example, the present disclosure relates to a method of manufacturing a shim for a die coater, which is applied to an electrode slurry die for discharging an electrode slurry, and the method includes: processing the shim for a die coater through a milling process. In a specific example, the processing of the shim for a die coater includes fixing a metal plate at a milling machine, and then milling a surface of the fixed metal plate using a milling cutter (C) which rotates against the surface of the metal plate to remove metal.

Further, the milling of the surface of the metal plate further includes forming a first slurry discharge line where opposing surfaces of a first guide and a sub-guide define a first opening that is the first slurry discharge line and forming a second slurry discharge line where opposing surfaces of a second guide and the sub-guide define a second opening that is the second slurry discharge line. The sub-guide is between the first and second guides. Further, the milling of the surface of the metal plate further includes cutting a step along each surface of the first and second guides and the sub-guide. Since the method of operating the milling machine was described above, the redundant description thereof is omitted here.

In a specific example, the shim for die coater according to the present disclosure further includes at least one sub-guide which is located between the first and second guides and allows the discharge line to branch. Herein, if the shim for a die coater according to the present disclosure includes n sub-guides, (n+1) discharge lines can be formed. Herein, 1 to 10 sub-guides may be included. For example, 3 sub-guides may be included. If 3 sub-guides are included between the first and second guides, the shim for a die coater according to the present disclosure may form 4 discharge lines. Further, sub-guides are included between the first and second guides in order to alternately stripe-coating the coated part and the non-coated part at the time of coating slurry.

In another example, the sub-guide has a step along a discharge line of a slurry. In a specific example, the sub-guide has a step formed on the boundary surface with the discharge line of slurry, and when slurry is discharged, the step is formed on the side surface of the sub-guide contacting the slurry. Namely, the thickness of the discharge line and the boundary surface of the slurry is set to be smaller than the entire thickness of the sub-guide. This is to smoothly apply slurry on the edge portion when coating slurry as in the first and second guides. Further, the thickness of the sub-guide and the thickness of the step may correspond to the thickness of the first and second guides.

In the present disclosure, it is possible to perform a precise processing work by applying a milling process during the manufacturing of a shim for a die coater. The thickness deviation may be low in the region where the step is formed.

DETAILED DESCRIPTION OF THE PREFERRED EMBODIMENTS

Hereinafter, various forms of a method of manufacturing a shim for a die coater using a milling process according to the present disclosure will be described with reference to drawings.

First Embodiment

FIG. 2 is a schematic diagram showing a process of manufacturing a shim for a die coater according to one embodiment of the present disclosure. Referring to FIG. 2, the present disclosure relates to a method of manufacturing a shim for a die coater, which is applied to an electrode slurry die for discharging an electrode slurry, and the method includes: processing the shim for a die coater through a milling process.

Specifically, the processing of the shim for a die coater includes fixing a metal plate at a milling machine, and then milling a surface of the fixed metal plate using a milling cutter (C) which rotates on the surface of the metal plate. Though not illustrated in FIG. 2, in order to process the shim for a die coater, a metal plate is fixed at a milling machine. The metal plate is fixed at a fixed die of a milling machine.

The milling cutter means a rotary cutting tool which is used in a milling machine. In FIG. 2, the milling cutter has a plurality of cutting edges on a cylindrical outer circumference, but the present disclosure is not limited to this example. In addition, the milling cutter may have a plurality of cutting edges on a conical outer circumference or cross-section.

The milling of the surface of the metal plate includes forming first and second guides 110 and 120 by cutting a slurry discharge line in the metal plate. Specifically, the milling cutter (C) is connected to a driving means such as a motor to be operated, and the die, at which the metal plate has been fixed, forms first and second guides 110 and 120 by cutting a slurry discharge line while moved in a left and right direction, in a state that the milling cutter (C) rotates. However, the present disclosure is not limited thereto. A die, at which the metal plate is fixed, is fixed, and the milling cutter (C) may cut the slurry discharge line while moved. As such, it is possible to process the shim 100 for a die coater to have a precise thickness. Further, the shim 100 for a die coater may have a discharge line at regular intervals.

The shim 100 for a die coater manufactured as described above has a plate shape. One side of the shim is opened, and the other side is closed. At this time, a slurry can be discharged through an opened region of the shim 100 for a die coater. Further, the base 130 can close the other end of the shim 100 for a die coater by connecting other ends of the first and second guides 110 and 120 to each other.

The first and second guides 110 and 120 are installed at one side of the base 130 to be spaced apart from each other and are directed in the same direction to be parallel to each other. Specifically, a region between the first and second guides 110 and 120 is a region where slurry is discharged, and the first and second guides 110 and 120 form the discharge line of slurry.

Further, the base 130 connects other ends of the first and second guides 110 and 120 to each other and is formed in a simple straight line form. However, the present disclosure is not limited thereto.

Second Embodiment

FIG. 3 is a schematic diagram showing a process of manufacturing a shim for a die coater according to another embodiment of the present disclosure. Referring to FIG. 3, the present disclosure relates to a method of manufacturing a shim for a die coater, which is applied to an electrode slurry die for discharging an electrode slurry, and the method includes: processing the shim for a die coater through a milling process.

Specifically, the processing of the shim for a die coater includes fixing a metal plate at a milling machine, and then milling a surface of the fixed metal plate using a milling cutter (C) which rotates on the surface of the metal plate. Though not illustrated in FIG. 3, in order to process the shim 200 for a die coater, a metal plate is fixed at a milling machine. The metal plate is fixed at a fixed die of a milling machine. Since the method of operating the milling machine was described above, the redundant description thereof is omitted here.

Further, the milling of the surface of the metal plate further includes: forming first and second guides 210 and 220 by cutting a slurry discharge line in the metal plate; and forming a step 240 along the slurry discharge line on one surface of the first and second guides 210 and 220. Further, a base 230 connects other ends of the first and second guides 210 and 220 to each other and is formed in a simple straight line form. Specifically, in the first and second guides 210 and 220 of the shim 200 for a die coater according to the present disclosure, an average thickness of regions where a step 240 is not formed is 1.5 mm, and an average thickness of regions where a step 240 is formed is 0.7 mm. However, the present disclosure is not limited thereto. In the process of forming the step, the slurry discharge line is cut using the milling cutter (C).

In this case, the shim 200 for a die coater manufactured according to the present disclosure can control the length and shape of the edge portion of the slurry coated on the electrode current collector by making the thickness of the boundary surface of the slurry discharge line of first and second guides 210 and 220 thin.

Particularly, in the present disclosure, it is possible to perform a precise processing work by applying a milling process during the manufacturing of a shim 200 for a die coater. The thickness deviation may be low in the region where the step 240 is formed.

Third Embodiment

FIG. 4 is a schematic diagram illustrating a shim for a die coater manufactured according to a method of manufacturing a shim for a die coater according to further another embodiment of the present disclosure. Referring to FIG. 4, the present disclosure relates to a method of manufacturing a shim for a die coater, which is applied to an electrode slurry die for discharging an electrode slurry, and the method includes: processing the shim for a die coater through a milling process.

Specifically, the processing of the shim 300 for a die coater includes fixing a metal plate at a milling machine, and then milling a surface of the fixed metal plate using a milling cutter (C) which rotates on the surface of the metal plate.

Further, the milling process forms first and second guides 310 and 320 and a sub-guide 350 between the first and second guides 310 and 320 by cutting the slurry discharge line in the metal plate. A base 330 connects other ends of the first and second guides 110 and 120 to each other and is formed in a simple straight line form. Further, the milling of the surface of the metal plate further includes forming a step 340 along the slurry discharge line on one surface of the first and second guides 310 and 320 the second guide. Since the method of operating the milling machine was described above, the redundant description thereof is omitted here.

The shim for a die coater manufactured according thereto includes a sub-guide 350 between the first and second guides 310 and 320. The sub-guide 350 is used to alternately stripe-coat the coated part and the non-coated part at the time of coating a slurry.

The sub-guide 350 has a step 340 along the discharge line of the slurry. Specifically, the sub-guide 350 has a step 340 formed on the boundary surface with the discharge line of slurry, and when slurry is discharged, the step 340 is formed on the side surface of the sub-guide 350 contacting the slurry. Namely, the thickness of the discharge line and the boundary surface of the slurry is set to be smaller than the entire thickness of the sub-guide 350. This is to smoothly apply slurry on the edge portion when coating slurry as in the first and second guides 310 and 320.

The sub-guide 350 has a step 340 at a portion corresponding to $3/10$ to $6/10$ of an entire height of the sub-guide 350. Specifically, in the sub-guide 350 of the shim 300 for a die coater according to the present disclosure, an average thickness of regions where a step 340 is not formed is 1.5 mm, and an average thickness of regions where a step 340 is formed is 0.7 mm. However, the present disclosure is not limited thereto. Further, since the first and second guides 310 and 320 were explained above, the detailed description for the first and second guides 310 and 320 is omitted here.

Particularly, in the present disclosure, it is possible to perform a precise processing work by applying a milling process during the manufacturing of a shim 300 for a die coater. The thickness deviation may be low in the region where the step 340 is formed.

Examples

A shim for a die coater according to a first embodiment was manufactured through a milling process. Specifically, the shim for a coater, which was used at the time of manufacturing a negative electrode, was manufactured based on 1.5 mm (example 1), and the shim for a coater, which was used at the time of manufacturing a positive electrode, was manufactured based on 2.0 mm. The shims manufactured according thereto are summarized in Table 1 below.

TABLE 1

| | Thickness of shim (mm) | Deviation (μm) | Electrode | Remark |
|---|---|---|---|---|
| Example 1 | 1.5081 | 8.11 | negative electrode | based on 1.5 mm |
| Example 2 | 2.0079 | 7.89 | positive electrode | based on 2.0 mm |

Thicknesses of shims according to examples 1 and 2 were 1.5081 mm and 2.0079 mm, respectively. At this time, the deviation of each of the shims was very low as 8.11 μm and 7.89 μm.

Further, an electrode slurry was coated using the shim for a die coater of example 1. At this time, the slurry coating yield was 98.6%.

Comparative Example

A shim for a die coater through a conventional wiring process was manufactured. The shims manufactured according thereto are summarized in Table 2 below.

TABLE 2

| | Thickness of shim (mm) | Deviation (μm) | Electrode | Remark |
|---|---|---|---|---|
| Comparative Example 1 | 1.4665 | 33.54 | negative electrode | based on 1.5 mm |
| Comparative Example 2 | 1.97 | 24.58 | positive electrode | based on 2.0 mm |

Thicknesses of shims according to comparative examples 1 and 2 were 1.4665 mm and 1.9754 mm, respectively. At this time, the deviation of each of the shims was very high as 33.54 μm and 24.58 μm.

Further, an electrode slurry was coated using the shim for a die coater of comparative example 1. At this time, the slurry coating yield was 97.4%.

Although preferred examples of the present disclosure have been described with reference to drawings, it can be understood that those skilled in the art can make various modifications and changes to the present disclosure without departing from the spirit and scope of the disclosure as set forth in the claims below.

Therefore, the technical scope of the present disclosure should not be limited to the contents described in the detailed description of the specification but should be defined by the claims.

DESCRIPTION OF REFERENCE NUMERALS

1: shim for die coater
10: die coater
11: body
12: upper die
13: lower die
14: inner space
15: supply port
16: discharge port
100, 200, 300: shim for a die coater
110, 210, 310: first guide
120, 220, 320: second guide
130, 230, 330: base
240, 340: step
350: sub-guide
C: milling cutter

The invention claimed is:

1. A method of manufacturing a shim for a die coater, where the shim is applied to an electrode slurry die of the die coater and used for discharging an electrode slurry from the die coater, the method comprising:

milling a surface of a metal plate to prepare the shim,
wherein the milling of the surface of the metal plate comprises cutting the metal plate to form a slurry discharge line defined by an open region between opposing surfaces of a first guide and a second guide, the open region having a downstream portion and an upstream portion, the upstream portion being wider along a lateral dimension than the downstream portion, the lateral dimension being perpendicular to upstream and downstream directions, and the open region extending to a discharge port along a downstream-most edge of the shim; and cutting a step along each of the opposing surfaces of the first and second guides such that the step extends along an entirety of the downstream portion of the open region between the upstream portion and the discharge port.

2. The method of claim 1, wherein milling the surface of the metal plate further comprises:

fixing the metal plate to a milling machine; and
milling the surface of the fixed metal plate using a milling cutter which rotates against the surface of the metal plate to remove metal and prepare the shim.

3. The method of claim 2, wherein the milling of the surface of the metal plate comprises:

cutting the metal plate to form a slurry discharge line having a first guide and a second guide that define an opening that is the slurry discharge line.

4. The method of claim 2, wherein the milling of the surface of the metal plate further comprises:

cutting the metal plate to form first and second slurry discharge lines, wherein opposing surfaces of a first guide and a sub-guide define a first opening that is the first slurry discharge line, and wherein opposing surfaces of a second guide and the sub-guide define a second opening that is the second slurry discharge line; and cutting a step along each surface of the first guide, the second guide, and the sub-guide.

5. The method of claim 4, wherein each step has a thickness that is $\frac{3}{10}$ to $\frac{6}{10}$ of the thickness of the first and second guides and the sub-guide.

6. The method of claim 4, wherein the step is cut using a milling cutter.

7. The method of claim 4, wherein, in the first guide, the second guide, and in the sub-guide, an average thickness of a region where a step is not formed is in a range of 1 mm to 3 mm, and an average thickness of a step is in a range of 0.4 mm to 0.9 mm.

8. The method of claim 1, wherein each step has a thickness that is $\frac{3}{10}$ to $\frac{6}{10}$ of the thickness of the first and second guides.

9. The method of claim 1, wherein the step is cut using a milling cutter.

10. The method of claim 1, wherein, in the first and second guides, an average thickness of a region where a step is not formed is in a range of 1 mm to 3 mm, and an average thickness of a step is in a range of 0.4 mm to 1.5 mm.

\*    \*    \*    \*    \*